(12) United States Patent
Angeles et al.

(10) Patent No.: US 6,382,038 B2
(45) Date of Patent: May 7, 2002

(54) TRANSMISSION DEVICE

(75) Inventors: Jorge Angeles, Singapore (SG); Max Antonio Gonzalez-Palacios, Westmount (CA)

(73) Assignee: McGill University, Montreal (CA)

( * ) Notice: Subject to any disclaimer, the term of this patent is extended or adjusted under 35 U.S.C. 154(b) by 0 days.

(21) Appl. No.: 09/816,129

(22) Filed: Mar. 26, 2001

Related U.S. Application Data

(63) Continuation-in-part of application No. 09/518,241, filed on Mar. 3, 2000, now abandoned, which is a continuation of application No. PCT/CA98/00831, filed on Sep. 1, 1998.
(60) Provisional application No. 60/057,490, filed on Sep. 4, 1997.

(51) Int. Cl.[7] ........................... F16H 25/04; F16H 25/18
(52) U.S. Cl. ............................. 74/84 R; 74/89; 74/567; 74/569
(58) Field of Search ........................ 74/84 R, 89, 567, 74/569

(56) References Cited

U.S. PATENT DOCUMENTS

| | | |
|---|---|---|
| 2,312,668 A | 3/1943 | Newton |
| 2,986,949 A | 6/1961 | Lancaster et al. |
| 3,170,333 A | 2/1965 | Umbnricht |
| 3,525,268 A | 8/1970 | Kenny |
| 4,576,099 A * | 3/1986 | Makino et al. .............. 104/287 |
| 5,116,291 A | 5/1992 | Toyosumi et al. |
| 5,123,883 A | 6/1992 | Fukaya |
| 5,167,590 A | 12/1992 | Kratochvil et al. |
| 5,176,036 A | 1/1993 | Harris |
| 5,222,922 A | 6/1993 | Takahashi et al. |
| 5,247,847 A | 9/1993 | Gu |
| 5,286,237 A | 2/1994 | Minegishi |
| 5,431,605 A | 7/1995 | Ko |
| 5,470,283 A | 11/1995 | Seidou |

FOREIGN PATENT DOCUMENTS

| | | |
|---|---|---|
| DE | 135239 | 10/1902 |
| FR | 346944 | 12/1904 |
| FR | 370492 | 12/1906 |
| GB | 2102532 | 2/1983 |

OTHER PUBLICATIONS

Roth, K.: "Evolventenverzahnungen mit extremen Eigenschaften" Antriebstechnik, vol. 35, No. 7, Jul. 1, 1996, pp. 43–48.

* cited by examiner

Primary Examiner—Allan D. Herrmann
(74) Attorney, Agent, or Firm—Swabey Ogilvy Renault; Robert Mitchell

(57) ABSTRACT

A transmission mechanism for transmitting motion with a uniform speed transmission factor between first and second moveable elements comprises a set of cams adapted to rotate with the first moveable element about a revolving axis, and corresponding arrays of spaced-apart rollers connected to the second moveable element for movement therewith. The cams cooperate in relays with the corresponding arrays of spaced-apart rollers to continuously communicate motion between the first and second moveable elements. The cams are in rolling contact with the corresponding arrays of rollers, whereby torque and force transmission can be performed smoothly. Furthermore, the transmission mechanism allows for the reversal of both the direction of the input speed and the roles of the first and second moveable elements.

14 Claims, 16 Drawing Sheets

TRANSMISSION DEVICE

RELATED APPLICATIONS

This is a continuation in part of U.S. patent application Ser. No. 09/518,241 filed on Mar. 3, 2000, now abandoned, which is a continuation of International PCT Application No. PCT/CA98/00831 filed on Sep. 1, 1998, which claims the benefit of U.S. Provisional Application No. 60/057,490 filed Sep. 4, 1997.

BACKGROUND OF THE INVENTION

1. Field of the Invention

The present invention relates to a transmission device and, more particularly, to a transmission device having rolling contact surfaces for transmitting motion between first and second moveable elements.

2. Description of the Prior Art

The effective operation of any transmission device relies on an accurate meshing of the parts in contact. In gear trains, accurate meshing is relaxed in favor of assemblability, thereby giving rise to backlash and its well-known drawbacks. While backlash in gear trains intended for power transmission at a constant rpm can be tolerated, in automation, machinery, such as robots, the speed reverses its sign continuously and, in sensor-based systems, unpredictably. In automation machinery, therefore, backlash hampers seriously the machine performance.

Robotic applications have called for a revision of alternative transmissions. In this vein, it has been proposed to replace gear trains by transmission devices based on the pure rolling action of a cam with respect to a roller. The idea has been pursued in the past, as attested by the following patents:

U.S. Pat. No. 3,170,333 by Emil Umbricht discloses a rotary positioning device specifically aimed at the coupling of parallel shafts for the production of indexing motion. The device comprises a plurality of rollers meshing with conjugate cams. The patent discloses two conjugate cams of an asymmetric shape, with high curvature changes.

U.S. Pat. No. 3,525,268 by Ronald H. Kenny discloses a parallel shaft cam drive intended for the production of either indexing motion or speed reduction. As its name states, this device pertains only to the coupling of parallel shafts. It comprises also a plurality of rollers meshing with two conjugate cams which, as in the Umbricht patent, bear asymmetric shapes with high curvature changes.

U.S. Pat. No. 5,176,036 by William O. Harris discloses a parallel shaft drive and indexing machine which, as its name indicates, is limited to both parallel shafts and indexing motion. The morphology of the device is similar to those of the Umbricht and Kenny patents.

U.S. Pat. No. 5,247,847 by Inhoy Gu discloses a cam gear assembly that is intended as a speed-reducing device. The device consists of a periodically-convex plate, with a shape proper of gears, meshing with a plurality of rollers. The patent is mostly intended for the coupling of parallel shafts, but it also contemplates the coupling of intersecting shafts.

The patents recalled above comprise invariably a cam element with a shape exhibiting pronounced changes of curvature, which hampers (a) the accurate machining of the profile and (b) the strength of the cam.

SUMMARY OF THE INVENTION

It is therefore an aim of the present invention to provide a new transmission device which is adapted to produce uniform speed transmission between two moveable elements.

It is a further aim of the present invention to provide a transmission device which is adapted to transmit power from an input element to an output element through a transmission mechanism having rolling-contact, thereby generating low friction resistance and low power losses.

It is an aim of the present invention to provide such a transmission device comprising conjugate cams with fully convex cam profiles.

It is a further aim of the present invention to provide a transmission device which produces low backlash and which is thus particularly suitable in specific areas that call for high accuracy and smooth operations.

It is an aim of the present invention to provide a transmission device which operates at low noise level.

It is a further aim of the present invention to provide a transmission device which can be designed to couple parallel or intersecting shafts at angles varying from 0 to 180 degrees.

It is a still further aim of the present invention to provide a transmission device which is adapted to link a revolving shaft to a translating rack.

Therefore, in accordance with the present invention, there is provided a transmission mechanism for producing uniform speed transmission between first and second moveable elements, comprising a set of conjugate cams adapted to rotate with said first moveable element about a first axis, and corresponding arrays of spaced-apart rollers connected to said second moveable element for movement therewith, said set of conjugate cams being adapted to alternately cooperate with said spaced-apart rollers of said corresponding arrays of spaced-apart rollers to communicate continuous motion to one of said first and second moveable elements in response to a driving action of the other of said first and second moveable elements, wherein each said cam has a fully convex cam profile.

BRIEF DESCRIPTION OF THE DRAWINGS

Having thus generally described the nature of the present invention, reference will now be made to the accompanying drawings, showing by way of illustration a preferred embodiment thereof and in which.

DESCRIPTION OF THE PREFERRED EMBODIMENTS

Figure 1:
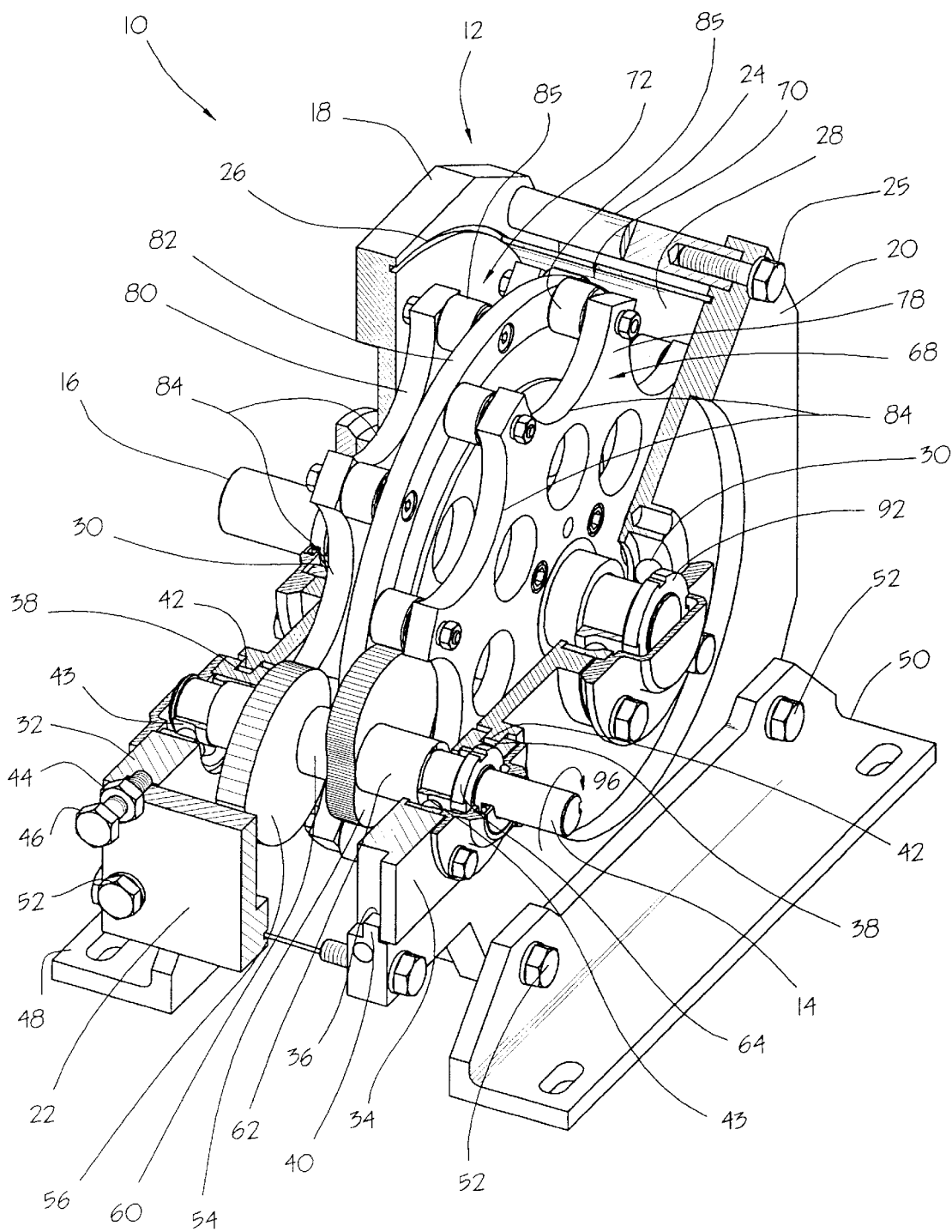
FIG. 1 is a perspective view partly in cross-section of a transmission device in accordance with the present invention.

Now referring to the drawings, and in particular to FIG. 1, a transmission device or speed reducer embodying the elements of the present invention and generally designated by numeral 10 will be described.

The transmission device 10 generally comprises a housing 12, an input shaft 14 and an output shaft 16 rotatably mounted within the housing 12 and connected to each other through a transmission mechanism having a constant speed reduction ratio.

Figure 2:
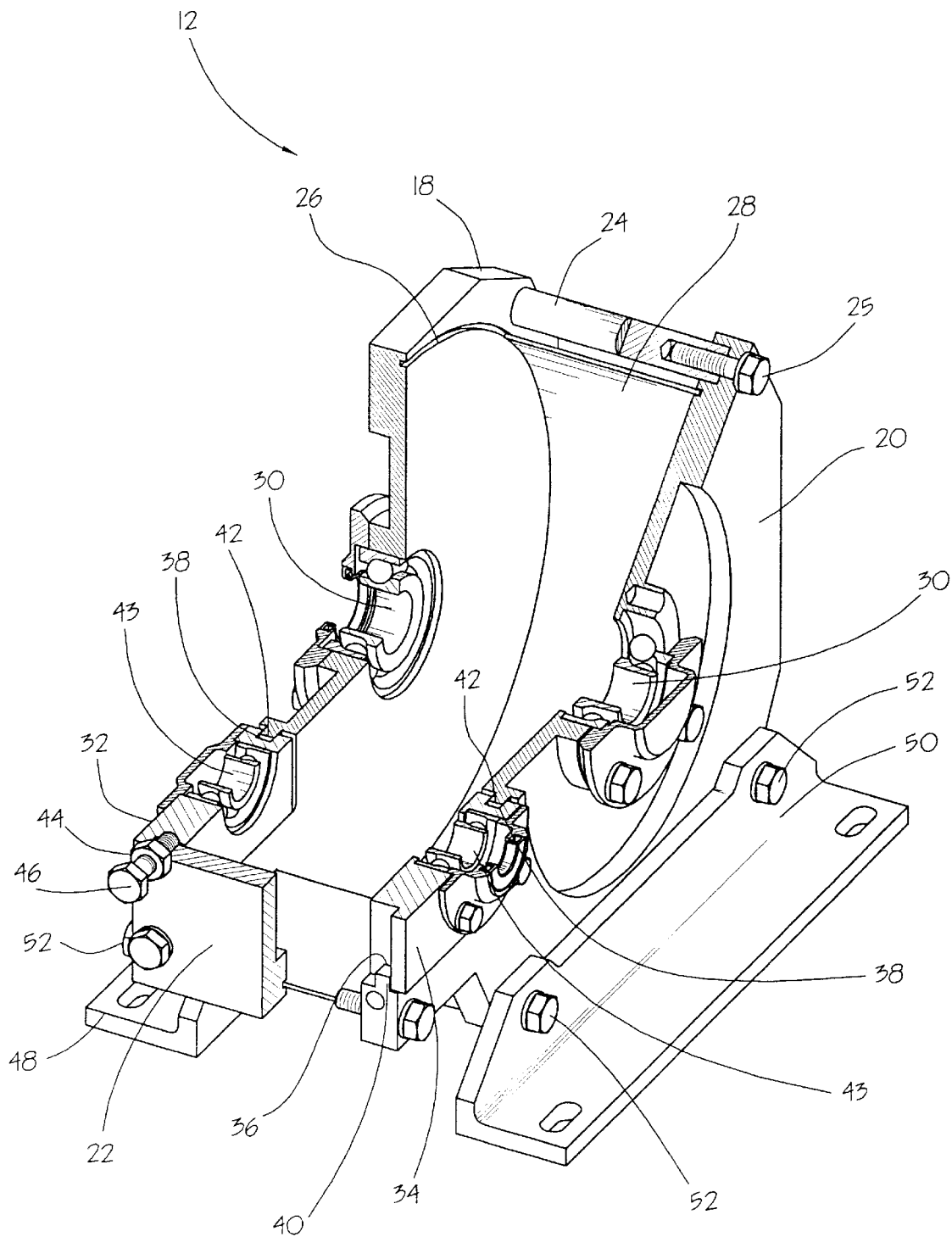
FIG. 2 is a perspective view partly in cross-section showing a housing of the device of FIG. 1.

More specifically, as shown in FIG. 2, the housing 12 includes two side plates 18 and 20 which are spaced-apart by a front plate 22 and a rear spacer 24 secured thereto by means of any suitable fasteners 25 such as screws or the like. A groove 26 following a curved path is defined on the interior side of each side plate 18 and 20 for receiving the side edges of a cover shell 28. The output shaft 16 is rotatably mounted to the housing 12 through a pair of bearings 30 which are respectively disposed within a bearing aperture defined in the side plates 18 and 20.

The housing 12 also includes two adjustable side plates 32 and 34 each capable of undergoing submillimetric translations along a horizontal channel 36 and a vertical channel 38 which mate respectively with a horizontal protrusion 40 and a vertical protrusion 42 extending from a front portion of each side plate 18 and 20. The main purpose of this arrangement is to allow a preloading of the rollers in contact with the cam, in order to ensure a force transmission without backlash. Accordingly, the adjustable side plate 32 can be slidably engaged onto the front portion of the side plate 18 while the adjustable side plate 34 can be slidably engaged onto the front portion of the side plate 20. Each adjustable side plate 32 and 34 is provided with a bearing 43 for rotatably supporting the input shaft 14. As illustrated in FIG. 2, a nut 44 engages a screw 46 which extends through the left corner of the front plate 22 and through the adjustable side plate 32 so as to slidably displace the adjustable side plate 32 relative to the front portion of the side plate 18. In a similar manner, the adjustable side plate 34 may be displaced relative to the front portion of the side plate 20. Therefore, translational misalignments of the input shaft 14 relative to the output shaft 16 may be compensated.

The housing 12 is also provided with a base portion in the form of two L-shape plates 48 and 50 which are respectively secured to the side plates 18 and 20 by way of fasteners 52.

Figure 3:
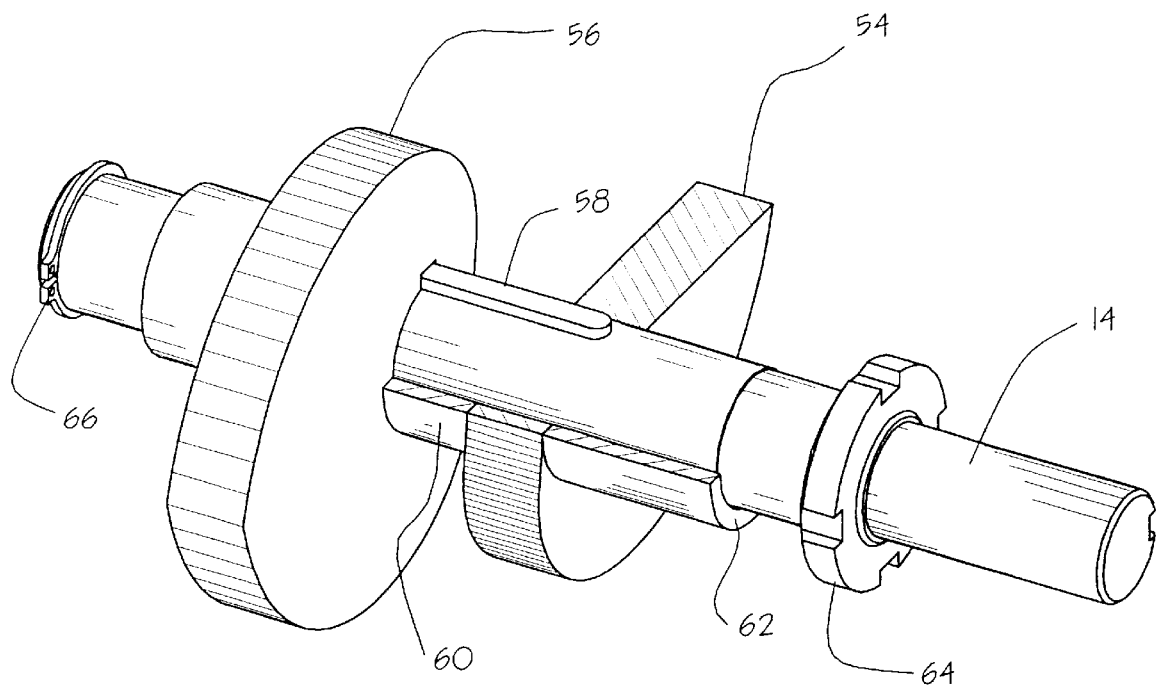
FIG. 3 is a perspective view partly in cross-section showing an arrangement of conjugate cams rigidly mounted on an input shaft of the device of FIG. 1.

Referring now to FIG. 3, it can be seen that two cam plates 54 and 56 are mounted on the input shaft 14 with a predetermined phase difference by means of a square key 58 which cooperates with a key way defined in both cam plates 54 and 56 to fixedly secure the same onto the input shaft 14, as it is well known in the art. Alternatively, and in order to allow a stiffer device, the two cam plates 54 and 56 and the shaft 14 thereof can be cut from a single blank, thereby eliminating the necessity of having a key way and square key assembly which require precise machining in order to avoid backlash.

More particularly, in the present embodiment, the two cam plates 54 and 56 are symmetrically installed at an angle of 180 degrees corresponding to each other, thereby forming a conjugate arrangement of cams.

A separating bushing 60 having a predetermined length is fitted on the input shaft 14 between the cam plates 54 and 56 to set the relative axial position thereof. Furthermore, an aligning bushing 62 is provided to set the axial position of the conjugate cams arrangement onto the input shaft 14 when the latter is installed into the housing 12.

A lock nut 64 and an external retaining ring 66 are mounted to the opposed ends of the input shaft 14 to restrict the axial displacement of the input shaft 14 within the housing 12.

Figure 4:
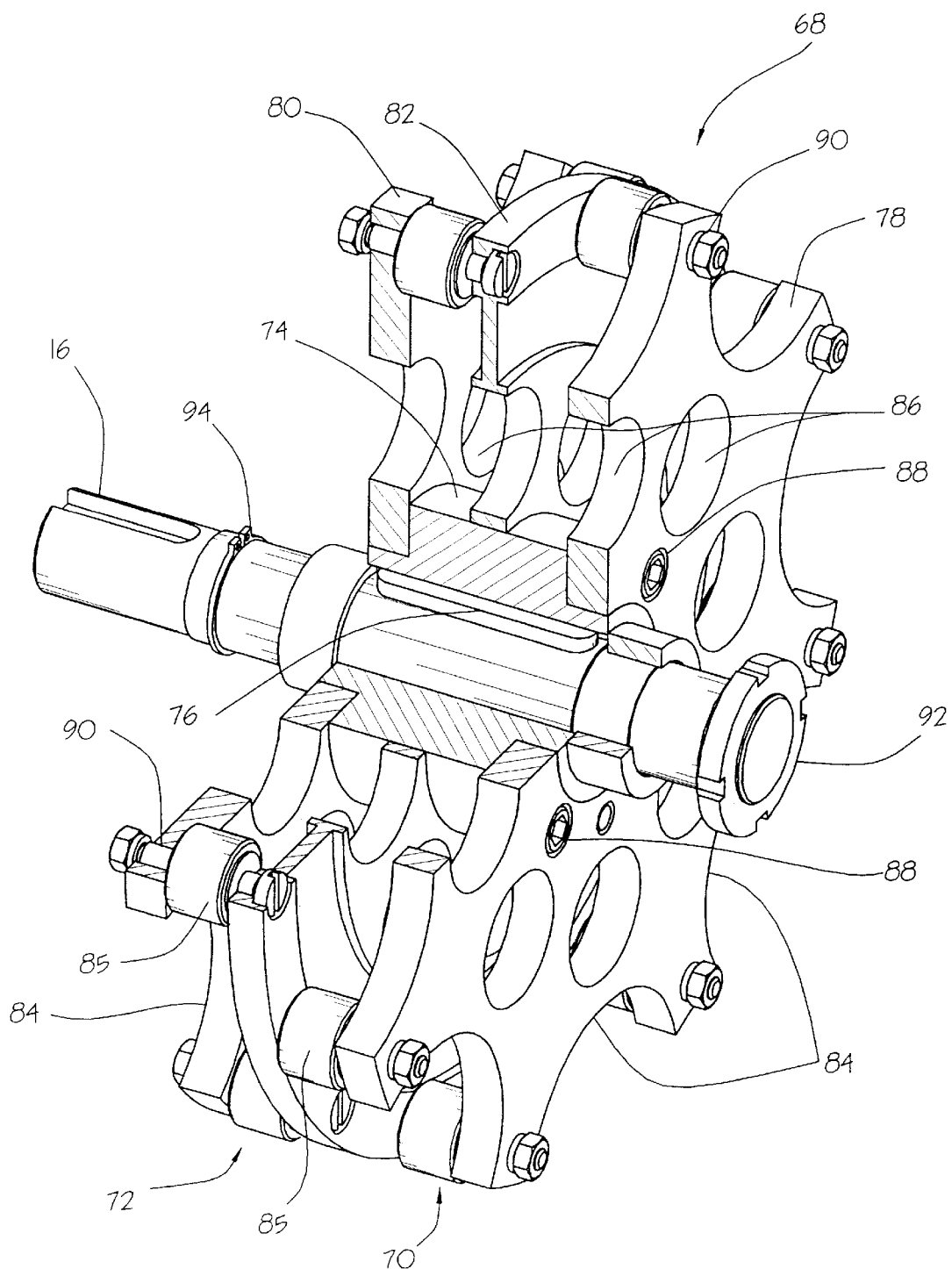
FIG. 4 is a perspective view partly in cross-section showing two sets of rollers revolvably disposed about the periphery of a circular carrier member which is in turn fixedly mounted to an output shaft of the device of FIG. 1.

As shown in FIG. 4, a carrier member 68 supporting a first row of rollers 70 and a second row of rollers 72 is fixedly mounted on the output shaft 16 through a coupling bushing 74 defining a key way (not shown) for receiving a square key 76 extending on the outer periphery of the output shaft 16.

The carrier member 68 includes a front disc 78, a rear disc 80 and a middle disc 82 with the relative axial position thereof being dictated by the coupling bushing 74 and by both rows of rollers 70 and 72 which are respectively disposed on either side of the middle disc 82 between the front disc 78 and the rear disc 80. The front and the rear discs 78 and 80 are provided with cutout portions 84 with the twofold purpose of reducing weight and easing the assembly of the rollers. Circular holes 86, or holes of alternative shapes, are also defined in the front disc 78, the rear disc 80 and the middle disc 82 for further reducing the weight of the carrier member 68. The front and the rear discs 78 and 80 are secured to the coupling bushing 74 by fasteners 88 and by the dowel pin 87.

Each roller 85 of the first row of rollers 70 is freely mounted on a roller pin 90 which extends through holes defined in the middle disc 82 and the front disc 78. In a similar manner, each roller 85 of the second row of rollers 72 is freely mounted on a roller pin 90 which extends through holes defined in the middle disc 82 and the rear disc 80. Therefore, the front disc 78, the middle disc 82 and the rear disc 80 rotate about the axis of the output shaft 16 as a single unit.

As clearly seen from FIG. 4, the first and the second rows of rollers 70 and 72 are shifted in phase by a predetermined angle which is a function of the number of rollers 85. For example, if the first and second rows of rollers 70 and 72 each includes eight rollers 85 uniformly distributed around the periphery of the carrier member 68, as in the preferred embodiment illustrated in FIGS. 1 to 5, the angle between two adjacent rollers 85 of the same row is 360°/8=45° and the phase difference between the first row and the second row of rollers 70 and 72 is equal to 45°/2=22.5°.

A lock nut 92 and an external retaining ring 94 are mounted on the opposed ends of the output shaft 16 to restrict the axial displacement of the output shaft 16 within the housing 12.

When the input shaft 14 and the output shaft 16 are assembled to the housing 12 as shown in FIG. 1, the cam plates 54 and 56 are respectively aligned with the first and second rows of rollers 70 and 72 such that rotation of the input shaft 14 will cause the cam plates 54 and 56 to alternately push on a roller 85 of the corresponding row of rollers 70 and 72 to thus transmit a torque from the input shaft 14 to the output shaft 16. In the contact condition shown in FIG. 1, that is at a particular instant of operation, the torque transmission is essentially effected through the cam plate 56 because the input shaft 14 rotates in the direction indicated by arrow 96. It is noted that even though, at that moment of operation, the cam plate 54 does not contribute to the torque transmission, it does not interfere with any other parts, since it is in relatively pure-rolling contact with the associated rollers 85 at all times.

It is noted that when it is desired that the rotation of the output shaft 16 be in the same direction to that of the input shaft 14, the cam members 54 and 56 may be disposed within the circle (the follower circle) passing through the centers of the rollers 70 and 72 (see FIG. 14) instead of outside as in the above described embodiment. This internal layout of FIG. 14 corresponds to an angle between shafts at 180°, while the external layout of FIG. 1 corresponds to an angle of 0°. The internal layout has the advantage of being compact.

Figure 14:
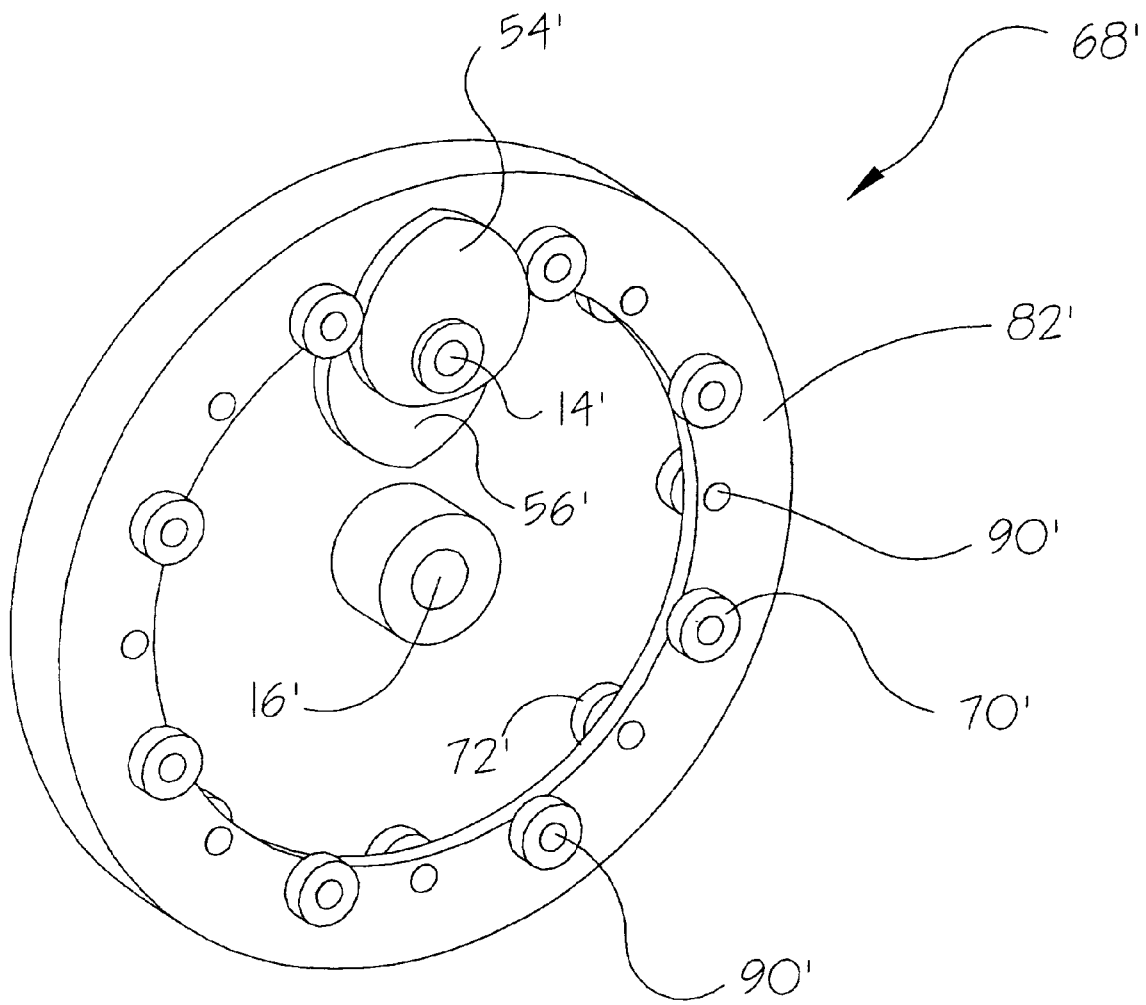
FIG. 14 illustrates an internal layout of the first embodiment but with fully-convex cam profile.

As shown in FIG. 14, the carrier member 68' can advantageously consist of a single ring member 69' having roller pins 90' extending from opposed sides thereof to hold two series of rollers 70' and 72'.

It is the unique profile of both cam plates 54 and 56 that allows the maintenance of relatively pure-rolling between the contact surface of the cam plates 54 and 56 and the associated first and second row of rollers 70 and 72, thereby providing a transmission device having superior efficiency and durability.

Figure 5:
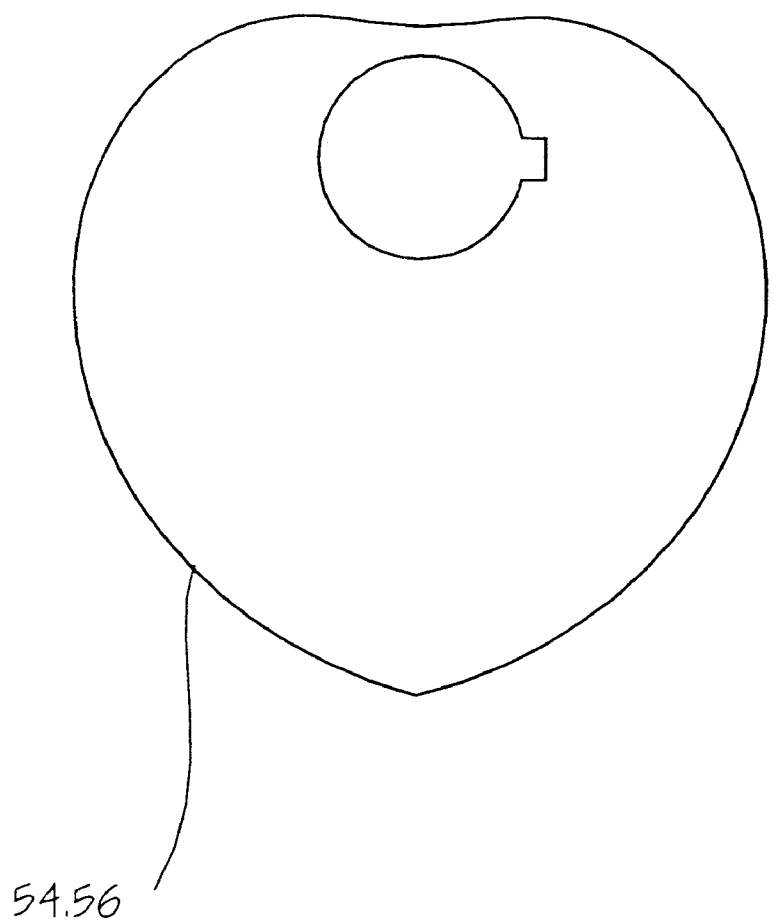
FIG. 5 is a front elevational view of a cam member of the present invention.

Moreover, the profile of the cam plates 54 and 56 ensures that a constant speed reduction ratio is obtained. As shown in FIG. 5, each cam plate 54 and 56 consists of a planar body having an essentially convex contact surface with the only concave portion thereof being at a dead point of this particular cam-follower arrangement, i.e. at a point where no torque transmission occurs, thereby preventing stress concentrations from affecting the service life of the transmission device. It is to be noted that the dead points of each cam-follower arrangement are out of phase by a maximum angle of 180°; thus, when one of the cams operates at a dead point, its conjugate (or conjugates) takes up the load, thus allowing for a continuous torque transmission. More particularly, the profile of the cam plates 54 and 56 is generated by a vector $r_c$ which is defined as follows:

$$a_3 < \frac{a_1}{1 + 1/N}$$

$$k_1 = \frac{a_1}{1 + N}$$

$$k_2 = \sqrt{(a_3\cos\phi + a_1 - k_1)^2 + a_3^2\sin^2\phi}$$

$$k_3 = \arctan\left(\frac{a_3\sin\phi}{a_3\cos\phi + a_1 - k_1}\right)$$

$$r_c = \begin{bmatrix} k_1\cos\psi + (k_2 - a_4)\cos(\psi - k_3) \\ -k_1\sin\psi - (k_2 - a_4)\sin(\psi - k_3) \\ \lambda \end{bmatrix}$$

wherein:
1/N: speed reduction ratio, with N being an integer equal to the number of rollers on each side of the second element;

$\psi$: angle of rotation of the input shaft with respect to the housing;

$\phi$: angle of rotation of the output shaft with respect to the housing;

$a_1$: distance between output and input shafts;

$a_3$: distance between output shaft and roller centers;

$a_4$: radius of the rollers;

$k_i$: temporary variables, where i=1,2,3 . . .

$\lambda$: real number defining one specific point along the contact line. It varies continuously between $\lambda_{min}$ and $\lambda_{max}$.

The vector $r_c$ defines the position of a point of the cam surface and thus, it may be used to generate a complete cam profile which will enable to transmit a motion with a uniform velocity from an input shaft to and output shaft having parallel axes. In other words, this equation allows the construction of a cam profile necessary to obtain a desired speed reduction ratio 1/N between two parallel shafts.

Applicants have found that fully convex profiles are to be favored in the design of precision cams, which are at the core of cam-based transmissions for speed reduction in automation machinery. However, the above expressions are too cumbersome to allow a terse analysis of the curvature of the cam profile. Accordingly, another approach had to be found to set the conditions that must be satisfied to ensure fully convex cam profiles.

If we denote with x and y the Cartesian coordinates of a planar curve, its curvature is given by $$\kappa = \frac{x'y'' - y'x''}{[(x')^2 + [(y')^2]^{3/2}}$$

where x' and x'' denote the first and the second derivative, respectively, of x with respect to the angle $\psi$ of rotation of the cam, which is assumed to turn counterclockwise, y' and y'' being defined likewise.

Now, the radius of curvature of the cam profile is the sum of that of the pitch curve, defined as the curve traced by the center of the roller as it moves with respect to the cam, and the radius of the roller. The curvature being the reciprocal of the radius of curvature, the relation between the curvatures of the pitch curve and the cam profile follows immediately. As a consequence of the above relation, a convex pitch curve guarantees a convex cam profile.

From the above expression for the curvature it is apparent that the derivatives of the cam profile with respect to $\psi$ will be needed. As mentioned hereinbefore, the expressions for the x and y coordinates of the cam profile are too cumbersome to allow for a terse analysis of the curvature. On the contrary, the Cartesian coordinates of the pitch curve are much simpler for the purpose at hand. The expressions for the Cartesian coordinates of the pitch curve are $$x = a_1\cos\psi + a_3\cos(\psi + \tilde{\phi})$$

$$y = -a_1\sin\psi - a_3\sin(\psi + \tilde{\phi})$$

The relation between $\phi$ above and $\tilde{\phi}$ is $$\tilde{\phi} = \pm\phi$$

where the positive sign is used for external layouts and the negative sign for their internal counterparts. After differentiation of the above expressions with respect to $\psi$, and with the definition $r=a_3/a_1$, we derive an expression for the curvature of the pitch curve in nondimensional form, namely, $$a_1\kappa = \frac{r^2(1+\tilde{\phi}')^3 + r[(1+\tilde{\phi}')(2+\tilde{\phi}')\cos\tilde{\phi} + \tilde{\phi}''\sin\tilde{\phi}] + 1}{\left(\left[r^2(1+\tilde{\phi}')^2 + 2r(1+\tilde{\phi}')\cos\tilde{\phi} + 1\right]\right)^{3/2}} \quad (1)$$

whence it is apparent that the sign of the curvature is that of its numerator, which will be henceforth denoted by $f(\phi;r)$ to stress that the numerator is a function of the angle of rotation of the follower, with r as a parameter, i.e., $$f(\phi;r) = r^2(1+\phi')^3 + r[(1+\phi')(2+\phi')\cos\phi + \phi''\sin\phi] + 1$$

Notice that, by virtue of the linear relation between $\phi$ and $\psi$, $\phi'=\pm 1/N$, i.e., $\phi'$ is a constant, while $\phi''=0$. The positive sign is used for external layouts and the negative sign for their internal counterparts. The condition on r for a convex profile is now readily derived by imposing that $f(\phi;r)$ remain positive for any value of $\phi$. We do this by imposing the condition that the equation $f(\phi;r)=0$ do not, admit a real root $\phi$, which thus leads, for external layouts, to $$r^2\left(1+\frac{1}{N}\right)^3 + r\left(1+\frac{1}{N}\right)\left(2+\frac{1}{N}\right)\cos\tilde{\phi} + 1 = 0$$

whence $$\cos\tilde{\phi} = -\frac{r^2(1+1/N)^3 + 1}{r(1+1/N)(2+1/N)}$$

For internal layouts, the same relation holds, except for the sign of 1/N, which would be negative. Apparently, the above expression yields a complex root $\phi$ whenever the fraction displayed above, which is apparently positive, is greater than unity, i.e., $$\left(1+\frac{1}{N}\right)^3 r^2 - \left(1+\frac{1}{N}\right)\left(2+\frac{1}{N}\right)r + 1 > 0$$

The above inequality holds for $$r > \frac{1}{1+1/N} \quad \text{and} \quad r < \frac{1}{(1+1/N)^2}$$

The range of values of r that satisfy this interval yield a cam profile with a curvature that does not change its sign in the external layout. However, these conditions are necessary, but not sufficient to obtain a realizable fully-convex cam. Sufficient conditions on r that guarantee a fully-convex, feasible cam profile are derived upon imposing the condition to avoid undercutting. Undercutting occurs when the follower or the cam cannot produce the desired path. This phenomena happens when the radius of the roller is greater than or equal to the minimum absolute value of the radius of curvature of the pitch curve. Therefore, to avoid undercutting, the radius of the roller must be greater than the maximum radius of curvature of the pitch curve, and hence, $$r < \frac{1}{1+1/N}$$

which thus rules out the first interval found above, so that $$0 < r < \frac{1}{(1+1/N)^2}$$

Figure 12:
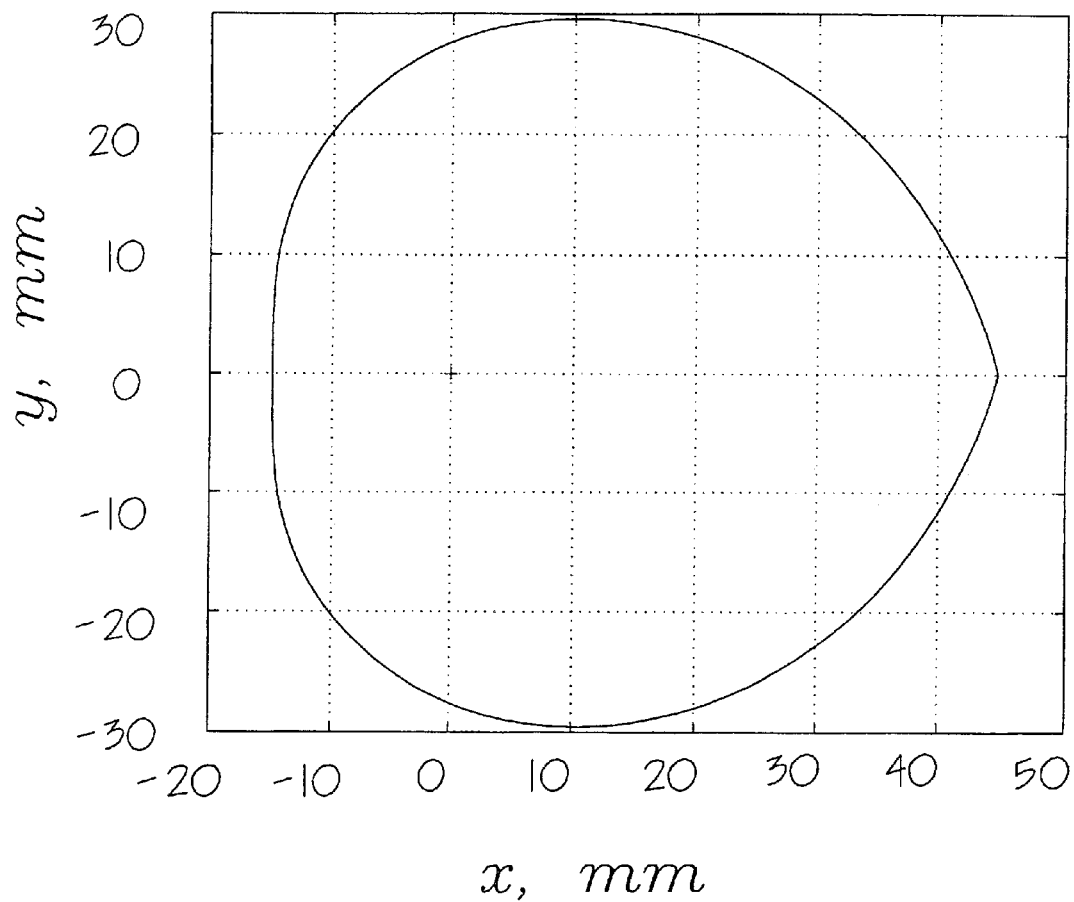
FIG. 12 is an example of a planar cam plate having a fully convex cam profile.

We have thus found the condition on $r=a_3/a_1$ to guarantee a fully convex cam profile for external layouts. Shown in FIG. 12 is an instance of the cam plate of the first embodiment with a convex cam of minimum curvature equal to zero and N=5, with r=0.6944 and $a_1$=75 mm.

For internal layouts $$r > \frac{1}{(1-1/N)^2}$$

gives the interval to ensure an acceptable fully-convex cam profile.

In operation, the rotation of the input shaft 14 directly drives the cam plates 54 and 56 which will in turn act on the rollers 85 to cause the carrier member 68 rotating the output shaft 16 in the opposite direction with a reduced rotational speed according to the profile of the cam plates 54 and 56. Indeed, the motion of the carrier member 68 and thus of the output shaft 16 depends upon the shape of the cam plates 54 and 56.

Figure 6:
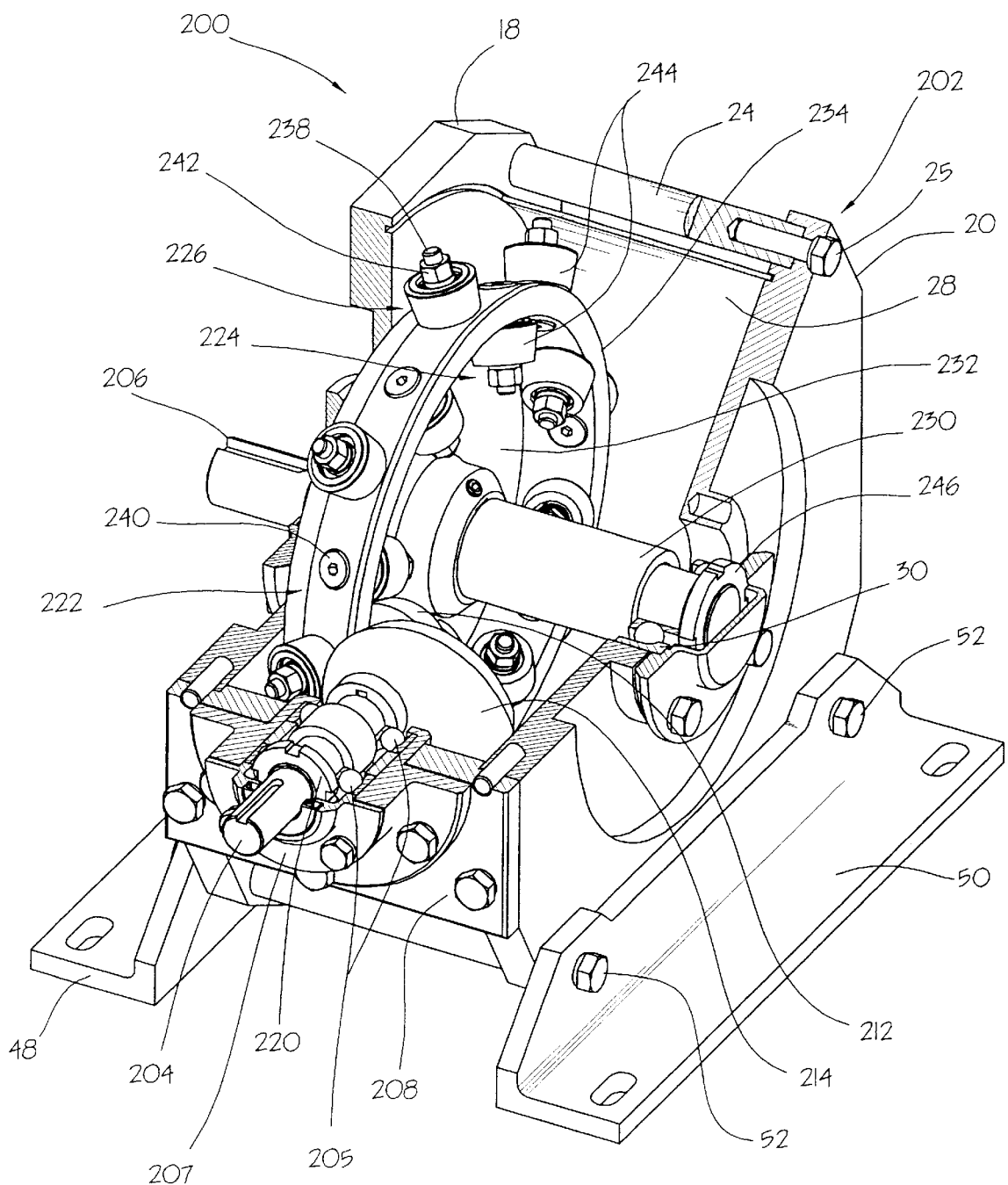
FIG. 6 is a perspective view partly in cross-section of a second preferred embodiment in accordance with the present invention.
Figure 7:
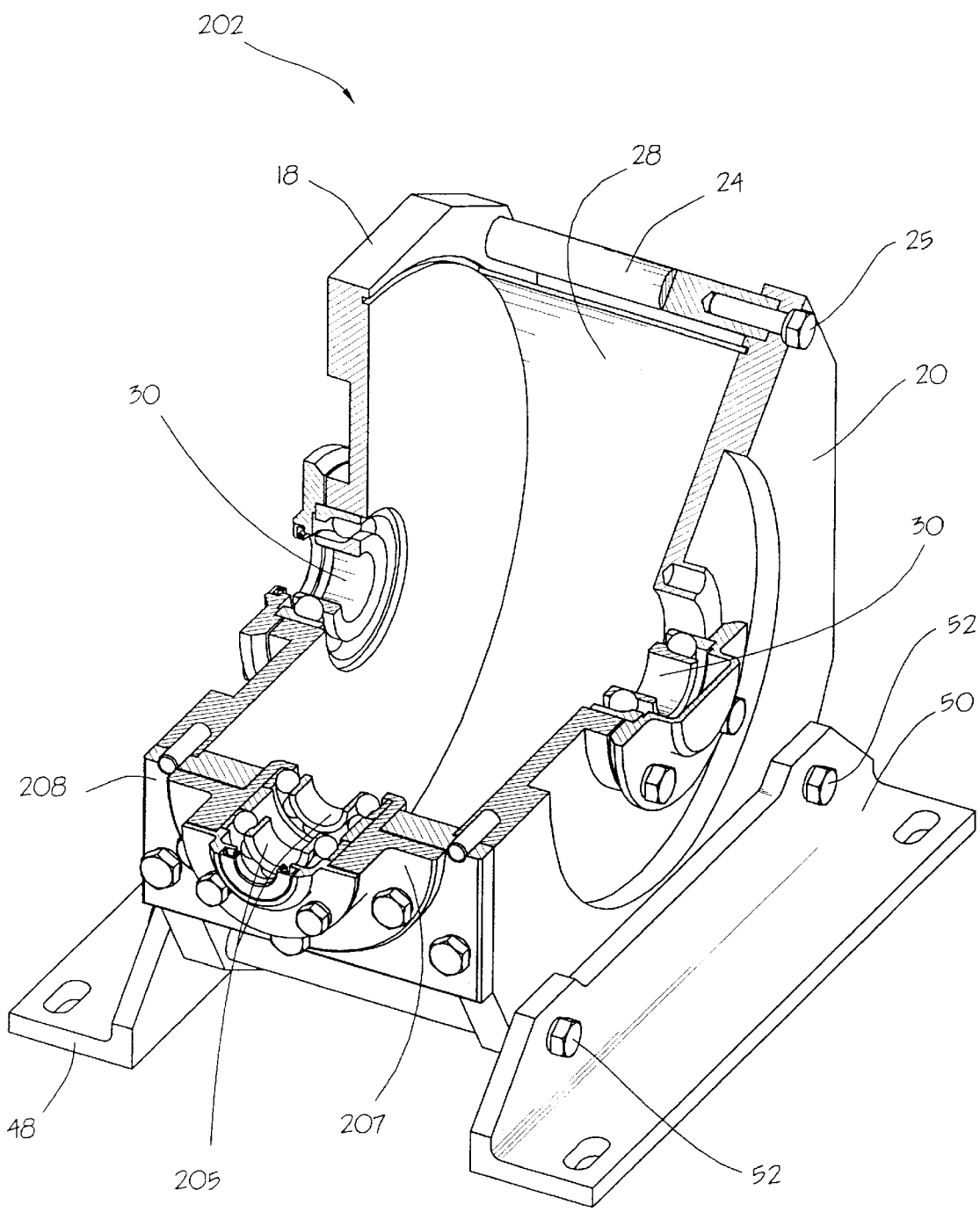
FIG. 7 is a perspective view partly in cross-section showing a housing of the device of FIG. 6.

FIG. 6 shows a second possible embodiment of the present invention wherein the longitudinal axis of the input shaft 204 intersects the longitudinal axis of the output shaft 206 at right angles, but the device can accommodate other angles between shafts. As shown in FIG. 7, the housing 202 of the second embodiment is essentially the same as the one described above except that the input shaft 204 is supported by a pair of bearings 205 disposed in a bearing housing 207 secured to a front plate 208. It is also noted that the housing 202 lacks any adjustable side plates. The remaining features of the housing 202 are similar to those of the embodiment shown in FIGS. 1 to 5, and thus their duplicate description will be omitted.

Figure 8:
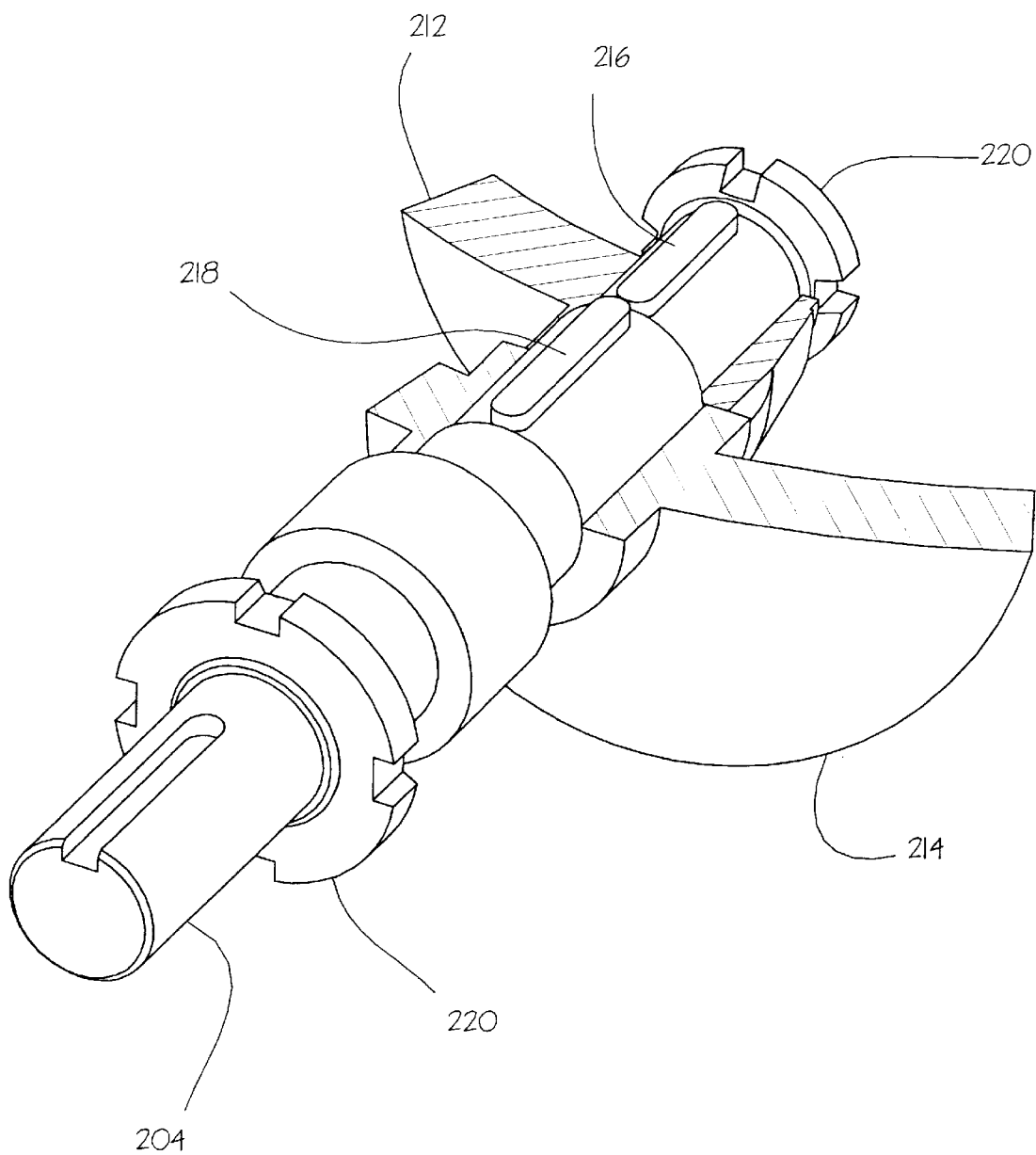
FIG. 8 is a perspective view partly in cross-section showing an arrangement of conjugate cams rigidly mounted on an input shaft of the device of FIG. 6.

Referring to FIG. 8, it can be seen that two cams 212 and 214 are mounted apart from each other onto the input shaft 204 with a predetermined phase difference (180° in this embodiment) by means of two square keys 216 and 218 which respectively cooperate with a key way defined in both cams 212 and 214 to fixedly secure the same onto the input shaft 204, as it is well known in the art.

A lock nut 220 is provided at each end of the input shaft to restrict the axial displacement of the cams 212 and 214 and of the input shaft itself within the housing 202.

Figure 9:
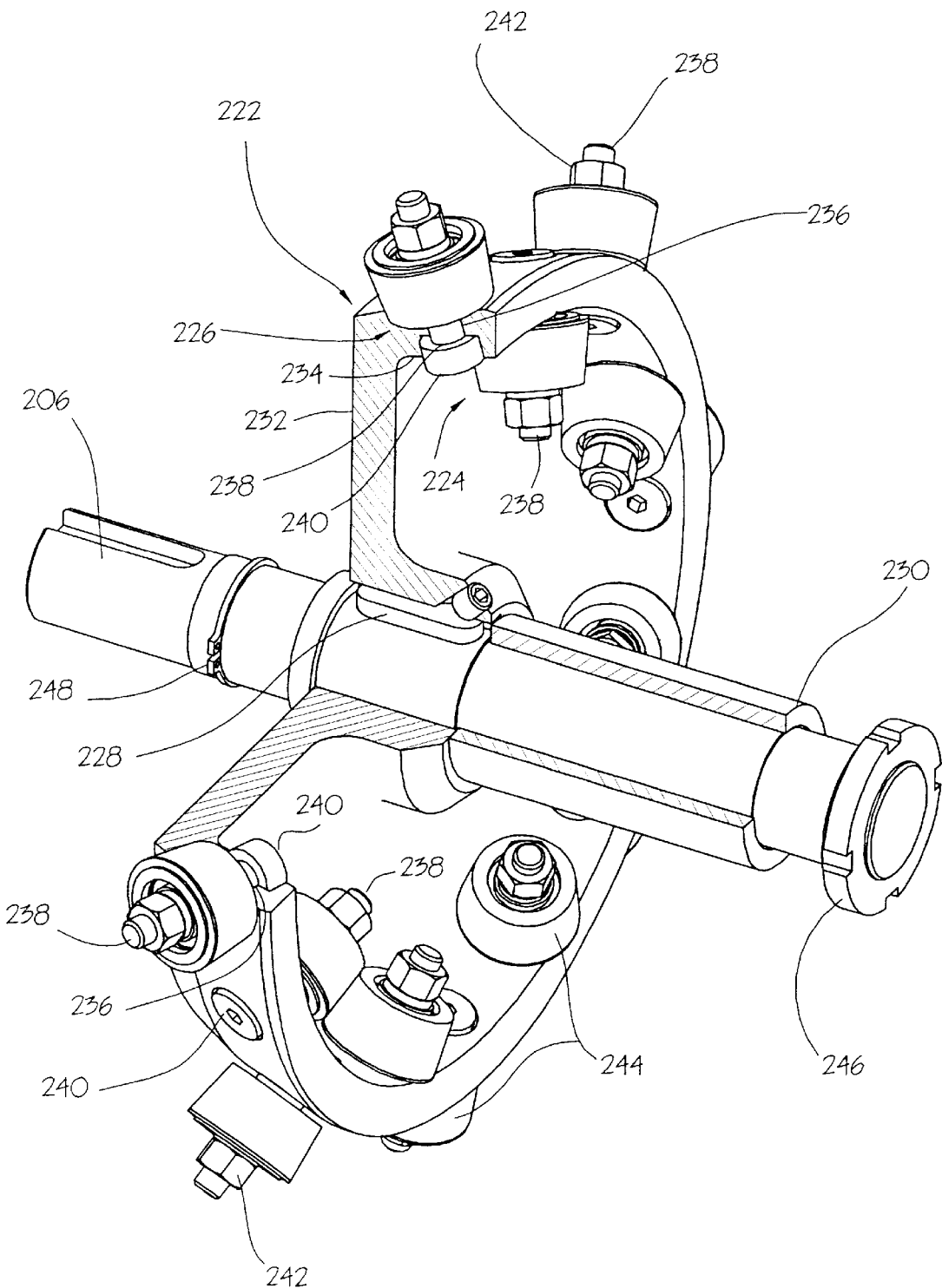
FIG. 9 is a perspective view partly in cross-section showing two sets of rollers revolvably disposed about the periphery of a carrier member which is in turn fixedly mounted to an output shaft of the device of FIG. 6.

Referring now to FIG. 9, it can be seen that a carrier member 222 supporting an internal row of rollers 224 and an external row of rollers 226 is mounted to the output shaft 206 for rotation therewith. The carrier member 222 is provided with a key way (not shown) which is adapted to slidably engage a square key 228 extending along a portion of the length of the output shaft 206. The axial positioning of the carrier member 222 to the output shaft 206 is ensured by an aligning bushing 230.

The carrier member 222 includes a disc 232 and an integral ring 234 extending at an angle from the periphery of the disc 232 for supporting the internal and external sets of rollers 224 and 226. Geometrically, the integral ring 234 corresponds to a segment of a sphere, i.e. a portion of a sphere contained between two parallel planes both intersecting the sphere. The integral ring 234 has holes 236 regularly distributed along the surface thereof for roller pins 238 to pass through.

As easily seen from FIG. 9, each roller pin 238 has a head 240 and a longitudinal body having a threaded portion which is adapted to cooperate with a bolt 242 to retain the roller pin 238 on the integral ring 234 and to restrict the axial displacement of a roller 244 mounted onto the longitudinal body of the roller pin 238. The roller pins 238 are alternately assembled to the integral ring 234 with the longitudinal body thereof extending inwardly and outwardly of the integral ring 234 such that adjacent roller pins 238 extend in opposite direction with respect to each other, whereby the internal and external row of rollers 224 and 226 are shifted in phase by an angle which is equal to 360°/number of roller pins.

The rollers 244 have a frusto-conical shape. As best seen in FIG. 9, the rollers 244 disposed outwardly of the integral ring 234 are mounted to the roller pins 238 with the smallest radius section thereof facing the head 240 of the roller pins 238, whereas the rollers 244 disposed inwardly of the integral ring 234 are mounted on the roller pins 238 with the greatest radius section thereof facing the head 240 of the roller pins 238.

As for the first embodiment, a lock nut 246 and an external retaining ring 248 are mounted on the opposed ends of the output shaft 206 to restrict the axial displacement of the output shaft 206 within the housing 202.

When the input shaft 204 and the output shaft 206 are assembled to the housing 202 as shown in FIG. 6, the cams 212 and 214 are respectively in rolling contact with the internal and external rows of rollers 224 and 226 such that rotation of the input shaft 204 will cause the cams 212 and 214 to alternately push on a roller 244 of the corresponding row of rollers 224 and 226 to thus transmit a torque from the input shaft 204 to the output shaft 206.

Figure 15:
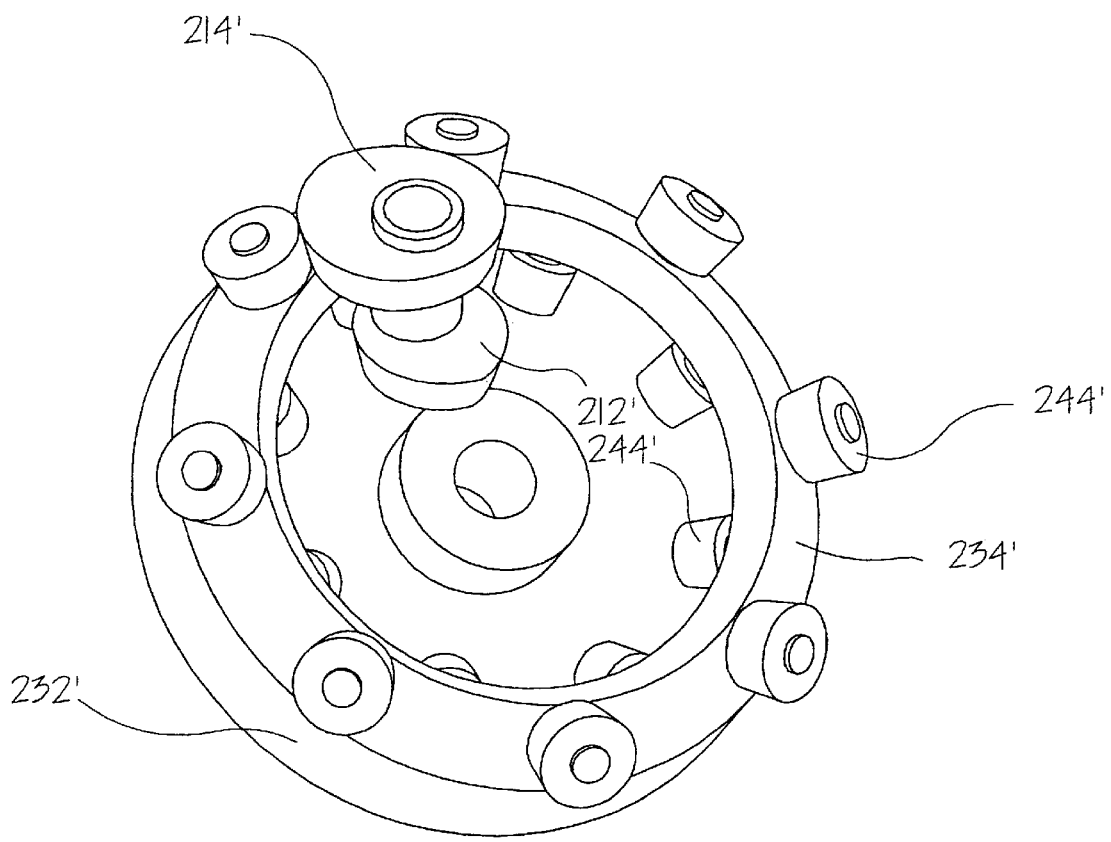
FIG. 15 illustrates an internal layout of the second embodiment but with fully-convex cam profile.

As for the first embodiment, the profile of the cams 212 and 214 is the key element to ensure that a constant speed reduction ratio is obtained. Accordingly, the profile of the cams 212 and 214 is generated by a position vector $r_c$ which is expressed as follows:

$$\alpha_3 < \arctan\left(\frac{\sin \alpha_1}{\cos \alpha_1 + 1/N}\right)$$

$$k_1 = \arctan\left(\frac{\sin \alpha_1}{\cos \alpha_1 - N}\right)$$
$$k_2 = \cos(\alpha_1 - k_1)\cos\phi\sin\alpha_3 + \cos\alpha_3\sin(\alpha_1 - k_1)$$
$$k_3 = \sin\alpha_3 \sin\phi$$
$$k_4 = \cos\alpha_3 \cos(\alpha_1 - k_1)\cos\phi\sin\alpha_3\sin(\alpha_1 - k_1)$$
$$k_5 = \arctan\left(\frac{\sqrt{k_2^2 + k_3^2}}{k_4}\right)$$
$$k_6 = \arctan\left(\frac{k_3}{k_2}\right)$$
$$k_7 = \sin k_1 \cos(k_5 - \alpha_4) + \cos k_1 \sin(k_5 - \alpha_4)\cos k_6$$
$$r_c = \lambda \begin{bmatrix} -k_7\sin\psi + \sin(k_5 - \alpha_4)\sin k_6 \cos\psi \\ -k_7\cos\psi - \sin(k_5 - \alpha_4)\sin k_6 \sin\psi \\ \cos k_1 \cos(k_5 - \alpha_4) - \sin k_1 \sin(k_5 - \alpha_4)\cos k_6 \end{bmatrix}$$

wherein:

$\alpha_1$: angle between output and input shafts;

$\alpha_3$: angle between output shaft and the axis of rotation of the rollers;

$\alpha_4$: angle of the roller cone;

The external layout illustrated in FIG. 6 is characterized by $\sin\alpha_1 > \sin\alpha_3$, whereas the internal layout (FIG. 15), i.e. wherein the common axis of rotation of the cams 212' and 214' is located inside the circular conic surface (follower cone) passing through all the axes of the rollers 244', is characterized by $\sin\alpha_1 < \sin\alpha_3$. An internal layout leads to an output angular-velocity vector with a component along the input angular velocity vector in the direction of the latter, what we call sense-preservation of the transmitted angular velocity. Likewise, an external layout leads to such a component pointing in the opposite direction of the input angular-velocity vector, what we call sense-reversal. Hence, an internal layout becomes indispensable when applications call for sense-preservation. If the sense of the output velocity is not an issue, then, still in the presence of input and output shafts intersecting at an angle other than 90 degrees, an internal layout is attractive, because it allows for a more compact transmission device.

In the second embodiment, the pitch curve and the cam profile of the previous one become curves on the unit sphere. The contact surface of the cam is a conic surface produced by a ray stemming from the center of the sphere, as it traverses the generatrix of the cam profile. As in the case of the first embodiment, the algebraic relations defining the generatrix of the cam profile are much more elaborate than those pertaining to the pitch surface. Likewise, the convexity of the latter guarantees that of the cam contact surface. We will thus work with the position vector e of a point on the generatrix of the pitch surface. Moreover, the roller becomes a frustoconic surface of cone angle $\alpha_3$. While $\alpha_1$ can attain any real value, we limit ourselves here to the specific case in which $\alpha_1 = 90°$, which is henceforth termed an orthogonal embodiment. In this embodiment, the generatrix of the pitch surface is given by the unit vector e, defined as $$e = \begin{bmatrix} -\cos\alpha_3 \sin\psi + \sin\alpha_3 \cos\psi \sin\phi(\psi) \\ -\cos\alpha_3 \cos\psi - \sin\alpha_3 \sin\psi \sin\phi(\psi) \\ -\sin\alpha_3 \cos\phi(\psi) \end{bmatrix}$$

The geodetic curvature of the generatrix of the pitch surface is given by $$\kappa_g = \frac{e \cdot (e' \times e'')}{\|e'\|^{3/2}}$$

with $e' = de/d\psi$ and $e'' = d^2e/d\psi^2$, and hence, the condition for a convex contact cam surface is that the numerator of the above expression do not change its positive sign, i.e., $$F(\psi; \alpha_3) = e \cdot (e' \times e'') > 0$$

Expressions for the foregoing derivatives and the mixed product were obtained with the aid of Maple 6 (a computer-algebra software package produced by Waterloo Maple Inc., of Waterloo, Ontario, Canada). In our second embodiment, we have used a value of $\alpha_3$ given by $$\alpha_3 = \arctan\left(\frac{1}{N}\right)$$

and if we recall that $\phi = \psi/N$, the expressions for e and its derivatives lead to a highly simplified expression, as obtained with the aid of Maple 6, namely, $$F(\psi; N) = \frac{1 + 2\cos(\psi/N) + \cos(\psi/N)N^4 - 3N^2\cos^2(\psi/N) - N^2\cos^3(\psi/N)}{(N^2(1 + N^2))^{3/2}}$$

Now, the condition sought is found by requiring that the roots $\psi$ of $F(\psi; N)$ be complex. Maple 6 finds that, of the three roots cos ($\psi$/N) of F($\psi$; N), only one is real, namely, $$\cos\left(\frac{\psi}{N}\right) = \frac{A-B}{B}$$

with A and B given below:

$$A = (-108N - 108N^5 - 216N^3 + C)^{2/3} + 24 + 12N^4 + 36N^2$$

$$B = 6N(-108N - 108N^5 - 216N^3 + C)^{1/3}$$

where C is defined as $$C = 12\sqrt{3}\sqrt{-(4N^6 - 3N^4 + 21N^2 + 32)(N^2 + 1)^3}$$

Although the above expression for cos ($\psi$/N) appears complex because of the negative radical, it is in fact real, because the two complex numbers A–B in the numerator and B in the denominator turn out to be real multiples of each other, as calculated by Maple 6. This real root was evaluated for values of N between 2 and 20, the results being shown in Table 1. For completeness, an entry with N=1 is also included. As this table attests, all the values of cos ($\psi$/N) that verify F($\psi$; N)=0, except for that corresponding to N=1, are greater than unity. As a consequence, all orthogonal embodiments with $\alpha_3$=arctan (1/N) have a fully-convex cam contact surface.

| N | cos (V) | N | cos (V) |
|---|---------|----|----------|
| 1 | 1.0 | 11 | 9.602584814 |
| 2 | 1.139944858 | 12 | 10.59398794 |
| 3 | 1.895708196 | 13 | 11.58672400 |
| 4 | 2.789219940 | 14 | 12.58050459 |
| 5 | 3.728836123 | 15 | 13.57511911 |
| 6 | 4.689626710 | 16 | 14.57041010 |
| 7 | 5.662012338 | 17 | 15.56625743 |
| 8 | 6.641474230 | 18 | 16.56256790 |
| 9 | 7.625585479 | 19 | 17.55926804 |
| 10 | 8.612920501 | 20 | 18.55629913 |

Table 1: Values of cos $\psi$, for various values of N, that produce a zero geodetic curvature of the spherical pitch surface.

The embodiment shown in FIG. 6 exhibits a convex profile, with N=8 and a3=arctan (⅛)=0.1243549945 rad= 7.125016344'. in this case, $$\cos(\psi) = \frac{58464.75362 + j42587.07423}{8802.978317 + j6412.292323} = 6.641474229$$

where j=$\sqrt{-1}$. Nevertheless, the foregoing relation yields an imaginary value of $\psi$, namely, $\psi$=j2.580764586.

Figure 10:
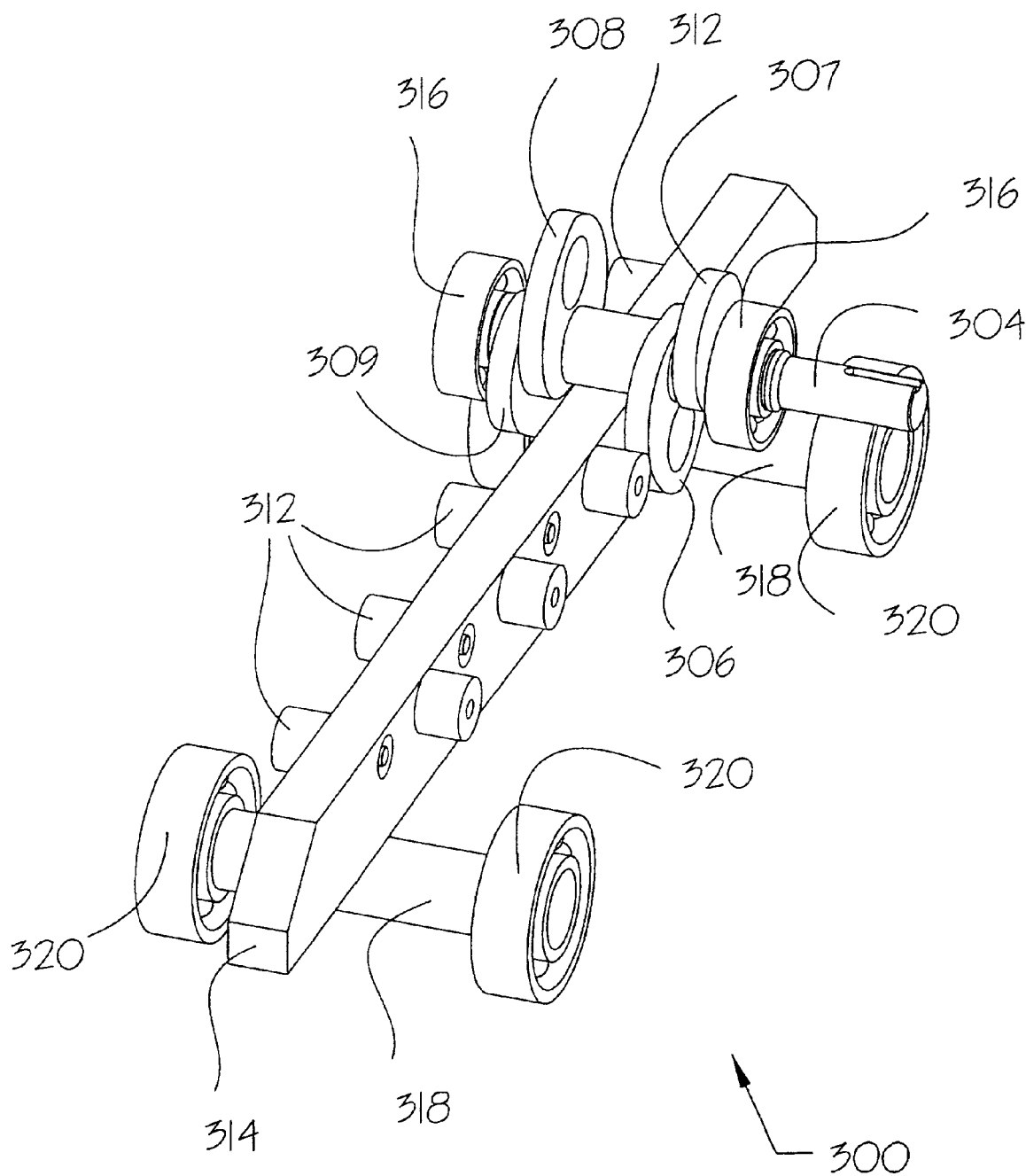
FIG. 10 is a schematic perspective view partly in cross-section of a transmission device in accordance with a third embodiment of the present invention for transforming a rotary motion into a linear motion or vice versa.

FIG. 10 shows a third embodiment of the present invention which may act as a substitute for a conventional rack and pinion transmission to communicate a revolution of a first element into a linear motion of another element or vice versa. More specifically, the transmission device 300 comprises a rotary shaft 304 on which a pair of spaced-apart cam plates 306 and 308 are mounted with a predetermined phase difference (180° in this embodiment) for respectively engaging first and second rows of rollers 310 and 312 distributed on opposed longitudinal sides of an elongated member 314.

It is noted that the cams 306 and 308 may be cut with the rotary shaft 304 from a unique blank, in one single piece to add stiffness to the transmission device 300. This concept is correspondingly applicable to the first two embodiments, i.e., to the transmission devices 10 and 200.

Unlike the first two embodiments, the transmission device 300 does not require a housing, since one of the moveable elements of the transmission mechanism, i.e. the elongated member 314, has a translational motion, and hence, the length of the stroke thereof is limited only by each application, the device 300 providing for an unlimited stroke length. However, the rotary shaft 304 is mounted on a supporting frame (not shown), which plays the role of a housing, by means of bearings 316 provided at opposed ends thereof. The elongated member 314 or rack is supported by way of rollers 318. Each roller 318 is journalled at opposed ends thereof within bearings 320 having respective external rings fixed to the supporting frame (not shown). The rollers 318 are thus constrained to a pure rotation about their revolving axes, without translating.

The rollers 310 and 312 are mounted on pins 322 extending at right angles from both sides of the elongated member 314. The pins 322 are uniformly distributed on each side of the elongated member 314. As shown in FIG. 10, the first and second row of rollers 310 and 312 are shifted in phase by a predetermined distance which is a function of the number of rollers.

The transmission device 300 is characterized by a speed transmission factor or pitch p defined as the quotient between the linear velocity of the elongated member 314 (m/s) by the angular velocity of the rotating shaft 304 (rad/sec).

Figure 11:
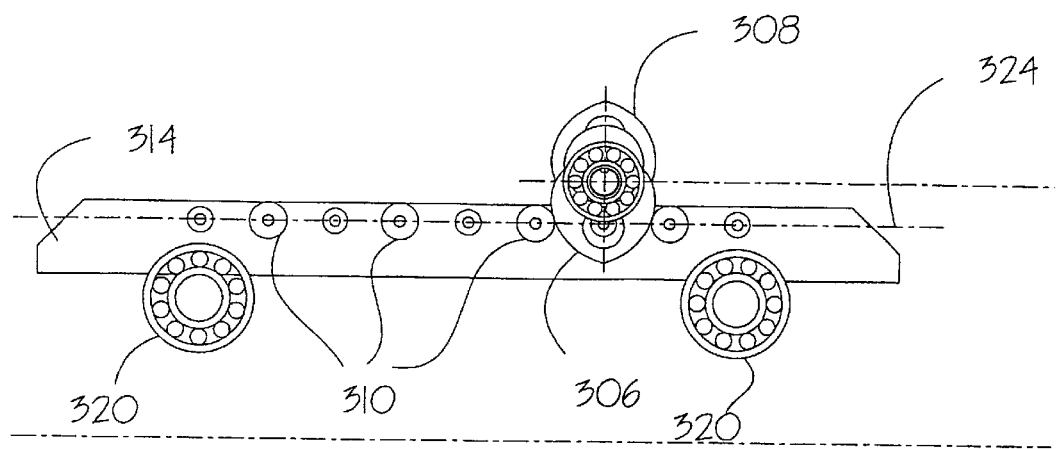
FIG. 11 is a schematic side elevational view of the transmission device of FIG. 10.

As for the first and second embodiments, the profile of the cam members 306 and 308 is the key element to ensure that a constant speed transmission is obtained. Accordingly, the profile of the cam members 306 and 308 is generated by a position vector $r_c$, which is expressed as follows:

$$\alpha_3 < \frac{a_1}{1 + 1/N}$$

$$k_1 = -\frac{2\pi a_3}{N}\sin\alpha_1$$

$$k_2 = \sqrt{\left(\frac{2\pi a_3 \psi \sin\alpha_1}{N}\right)^2 + \left(a_1 + a_3 + \frac{2\pi a_3 \sin\alpha_1}{N}\right)^2}$$

$$k_3 = \arctan\left(\frac{-2\pi a_3 \psi \sin\alpha_1}{(a_1 + a_3)N + 2\pi a_3 \sin\alpha_1}\right)$$

$$r_c = \begin{bmatrix} k_1 \cos\psi + (k_2 - a_4)\cos(k_3 - \psi) \\ -k_1 \sin\psi + (k_2 - a_4)\sin(k_3 - \psi) \\ \lambda \end{bmatrix}$$

wherein:
  1/N: where N is an integer denoting the number of rollers on each side of the linearly translating member that enter in contact with corresponding cams upon a full turn of the cam shaft;
  $\psi$: angle of rotation of the rotating shaft with respect to the supporting frame;
  $\alpha_1$: angle between the rotating shaft and the longitudinal axis of the elongated member;
  $a_1$: distance between the revolving axis of the rotating shaft and a reference line parallel to a longitudinal axis of the elongated member;
  $a_3$: distance between the reference line and roller centers;
  $a_4$: radius of rollers;

As seen in FIG. 11, the center of the rollers 310 and 312 are disposed along a common line 324 which is spaced by a distance $a_3$ from a reference line 326 parallel to a longitudinal axis of the elongated member 314. The variable $a_1$ is also established with reference to the line 324.

As in the first two embodiments, in this embodiment the algebraic expressions for the cam profile are much more cumbersome than those for the pitch curve.

For this reason, we set the conditions for a fully-convex profile based on the pitch curve, the Cartesian coordinates x and y of any of its points being given below:

$$x = (a_1 + a_3)\cos\psi - z_3 \sin\alpha_1 \sin\psi$$
$$y = -(a_1 + a_3)\sin\psi - z_3 \sin\alpha_1 \cos\psi$$

In our case $\alpha_1 = -\pi/2$, the above expressions thus becoming $$x = (a_1 + a_3)\cos\psi + z_3 \sin\psi$$
$$y = -(a_1 + a_3)\sin\psi + z_3 \cos\psi$$

Now, the curvature of the pitch curve is derived from the same formula used for the first embodiment, which thus yields $$\kappa = \frac{A(\psi)}{B(\psi)}$$

with $A(\psi)$ and $B(\psi)$ given by $$A(\psi) = -(a_1 + a_3)^2 + 2z_3'(a_1 + a_3) - z_3^2 - 2z_3'^2,$$
$$B(\psi) = \{[(a_1 + a_3) - z_3']^2 + z_3^2\}^{3/2} > 0.$$

Moreover, the translation $z_3$ of the slider 314 of FIG. 10 in terms of the angle of rotation $\psi$ of the cam is given by $$z_3 = \frac{\pi - \psi}{N} a_3,$$

where N=8 and $a_3$=−73.92 mm in the embodiment shown in the abovementioned figure. We thus have:

$$z_3'(\psi) = \frac{-a_3}{N}.$$

Substituting $z_3$ and $z'_3$ into the expressions for the Cartesian coordinates of an arbitrary point of the pitch curve, and its subsequent derivatives, yields, for the numerator of K, $$A(\psi) = -(a_1 + a_3)^2 - \frac{3a_3}{N}(a_1 + a_3) - \left(\frac{(\pi - \psi)a_3}{n}\right)^2 - 2\left(\frac{a_3}{N}\right)^2$$
$$= a_3^2\left[-\left(\frac{a_1}{a_3} + 1\right)^2 - \frac{3}{N}\left(\frac{a_1}{a_3} + 1\right) - \left(\frac{(\pi - \psi)}{n}\right)^2 - 2\left(\frac{1}{N}\right)^2\right]$$

The necessary condition for a convex profile is thus $A(\psi)>0$, for $\psi \in [0, 2\pi]$. Moreover, for convenience, we introduce the ratio $R=(a_1+|a_3|)/|a_3|$, where the absolute value is used because $a_3$ can attain negative values, as it indeed does in the embodiment disclosed in FIG. 10. The above expression for $A(\psi)$ then becomes $$A(\psi; R) = a_3^2\left[-R^2 - \frac{3}{N}R - \left(\frac{\pi - \psi}{N}\right)^2 - \frac{2}{N^2}\right]$$

It is thus apparent that $A(\psi; r)$ does not change sign in $[0, 2\pi]$ if the above quadratic equation in R has no real roots, for any value of $\psi$. This occurs if the discriminant of the above equation is nonpositive, i.e., if $$R^2 + \frac{3}{N}R + \frac{2}{N^2} > 0$$

The above inequality yields two ranges of values of R, namely, $$R > -\frac{1}{N} \text{ and } R > -\frac{1}{N}$$
$$|a_3| > \frac{a_1}{1/N + 1} \text{ and } |a_3| < \frac{a_1}{2/N + 1}$$

and hence,

To avoid undercutting, moreover, we must have $|a_3|<a_1/(2/N+1)$, which thus leads to the range $$a_3 < a_1/(2/N+1)$$

for a convex pitch curve, and hence, for a convex cam profile.

Figure 13:
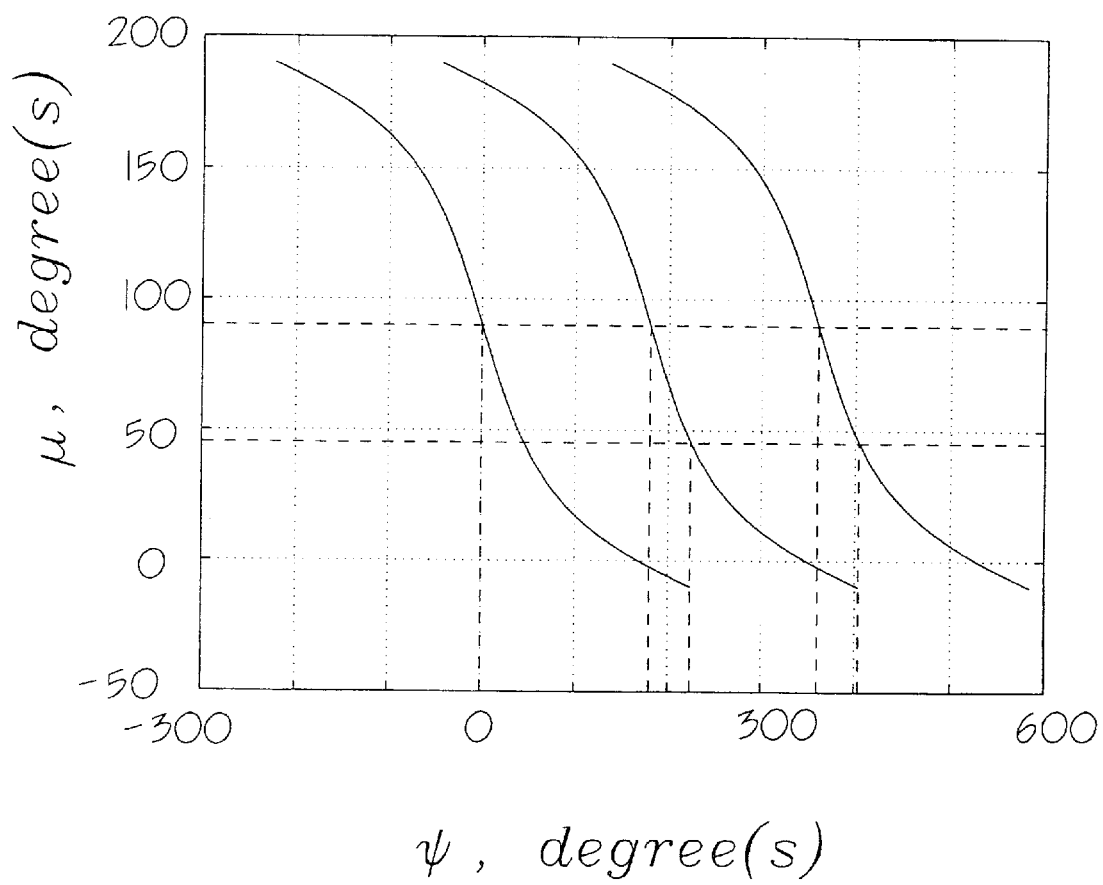
FIG. 13 is a graph of the pressure angle distribution with $|a_3|/a_1=0.8$ of the third embodiment.

For a fixed value of $a_1$, the smaller $a_3$, the smaller the overall pressure angle. To obtain a convex cam with a relatively small pressure angle, we set the $|a_3|/a_1$ ratio as 0.8. The pressure angle is plotted in FIG. 13.

The third embodiment of FIGS. 10 and 11 can be modified to allow for a convex cam profile, the new design parameters being $a_1$=92.4 mm, $a_3$=−73.92 mm, with N=8.

In operation, the rotary shaft 304 may be driven to cause the cam members 306 and 308 to alternately act on the corresponding row of rollers 310 and 312 to translate the elongated member 314 in a direction parallel to the longitudinal axis thereof. Alternatively, the elongated member 314 may be driven such as to successively push a roller of the first and second rows 310 and 312 against the cam members 306 and 308, respectively, to cause the rotary shaft 304 to rotate.

It is understood that although the longitudinal axis of the elongated member 314 is at right angles with the axis of the shaft 304 in the embodiment illustrated in FIG. 10, the transmission device 300 can accommodate other angles.

Figure 16:
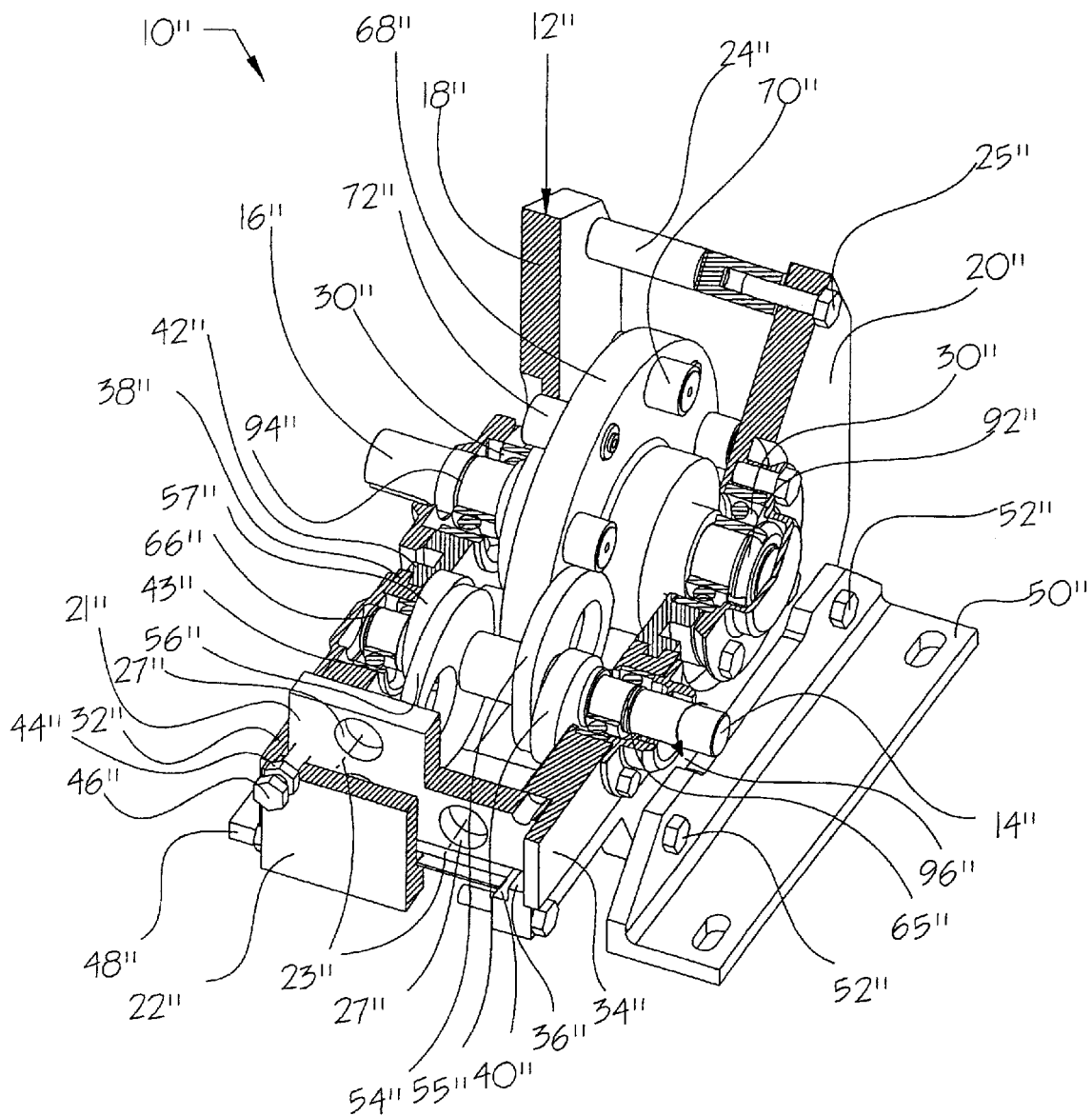
FIG. 16 is a perspective view partly in cross-section of a fourth embodiment in accordance with the present invention.

FIG. 16 illustrates a modified version of the transmission device of FIG. 1. The transmission device of FIG. 16 differs from the one in FIG. 1 in that it is provided with fully convex cam plates 54" and 56". Furthermore, counterweights 55" and 57" are provided on the input shaft 14" for balancing same. The shaft 14", the cams 54" and 56", and the counterweights 55" and 57" are preferably integral. Also four coil springs, represented by their axis 23", have been added between the front plate 22" and a plate 21" defining four spring seats 27" arranged at the corner of an imaginary square. The springs provide for adjustment to compensate for submillimetric distance variations between the cam shaft 14" and the roller carrying shaft 16". Moreover, the carrier member 68" consists of a single disc and the number of rollers 70" and 72" on each side of the carrier member 68" has been limited to five in view of the fully convex profile of the cams 54" and 56" and in order to obtain a suitable contact pressure between the rollers 70" and 72" and the cams 54" and 56".

One advantage of the four above-described embodiments and variations thereof resides in the fact that they allow for a reversal of both the direction of the input speed and the roles of the input and output elements.

The present invention is not limited to the above-described embodiments. For example, double trains or multiple trains (i.e. multistage transmission devices) can be provided and linked to obtain a higher speed ratio of the transmission. The present invention also includes in its scope a construction in which the three above described embodiments are used in combination.

We claim:

1. A transmission mechanism for producing uniform speed transmission between first and second moveable elements, comprising a set of conjugate cams adapted to rotate with said first moveable element about a first axis, and corresponding arrays of spaced-apart rollers connected to said second moveable element for movement therewith, said set of conjugate cams being adapted to alternately cooperate with said spaced-apart rollers of said corresponding arrays of spaced-apart rollers to communicate continuous motion to one of said first and second moveable elements in response to a driving action of the other of said first and second moveable elements, wherein each said cam has a fully convex cam profile.

2. A transmission mechanism as defined in claim 1, wherein said cams are shifted in phase by a prescribed angle, and wherein said corresponding arrays of spaced-apart rollers are connected to said second moveable element with a prescribed phase difference via a carrier, each said corresponding array of spaced-apart rollers including a plurality of uniformly distributed rollers which are configured to be engaged by corresponding cams, said carrier including a single support element to which all said corresponding arrays of spaced-apart rollers are mounted.

3. A transmission mechanism as defined in claim 2, wherein said cams have respective fully convex contoured cam surfaces configured to be in rolling-contact with said rollers of said corresponding arrays of spaced-apart rollers to achieve a prescribed speed transmission factor 1/N between said first and second moveable elements, N being an integer.

4. A transmission mechanism as defined in claim 1, wherein said first and second moveable elements, respectively, include first and second shafts having parallel axes, said cams being disposed at axially spaced-apart locations on said first shaft for rotation therewith about said first axis, each of said cams being in a common plane with one of said corresponding arrays of spaced-apart rollers, said rollers of each said corresponding arrays of spaced-apart rollers having respective axes lying on a circular cylinder coaxial with said second shaft, said circular cylinder having a radius $a_3$, each said roller having a cylindrical configuration and being axially disposed relative to said second shaft, and wherein each said cam has a fully convex contoured cam surface generated by a vector $r_c$ which is defined as follows:

$$a_3 < \frac{a_1}{1+1/N}$$

$$k_1 = \frac{a_1}{1+N}$$

$$k_2 = \sqrt{(a_3\cos\phi + a_1 - k_1)^2 + a_3^2\sin^2\phi}$$

$$k_3 = \arctan\left(\frac{a_3\sin\phi}{a_3\cos\phi + a_1 - k_1}\right)$$

$$r_c = \begin{bmatrix} k_1\cos\psi + (k_2 - a_4)\cos(\psi - k_3) \\ -k_1\sin\psi - (k_2 - a_4)\sin(\psi - k_3) \\ \lambda \end{bmatrix}$$

wherein:

$\psi$: is an angle of rotation of the first shaft;

$\phi$: is an angle of rotation of the second shaft;

$a_1$: is the distance between the first and second shafts;

$a_4$: is the radius of the rollers;

$k_i$: are temporary variables, where i=1,2,3 . . .

$\lambda$: is a real number defining one specific point along the contoured cam surface;

N: an integer producing the speed reduction as 1/N, with N being equal to the number of rollers on each side of the second element;

and with $r=a_3/a_1$ satisfying the following condition $$0 < r < \frac{1}{(1+1/N)^2}$$

when said first axis is located outside the circular cylinder, and the following condition $$r > \frac{1}{(1-1/N)^2}$$

when said first axis is located inside the circular cylinder.

5. A transmission mechanism as defined in claim 4, wherein said first and second shafts are mounted to distinct moveable parts of a frame structure for providing a preloading of said rollers in contact with said contoured cam surfaces.

6. A transmission mechanism as defined in claim 4, wherein said arrays of spaced-apart rollers are assembled to a unitary carrier member fixedly mounted on said second shaft.

7. A transmission mechanism as defined in claim 4, wherein said set of cams includes two cams which are out of phase by an angle of 180 degrees and which operate in relays with the rollers of two corresponding arrays of spaced-apart rollers to provide a continues torque transmission between said first and second shafts, said arrays of spaced-apart rollers being shifted in phase by an angle which is equal to the quotient of 360 degrees by the number of rollers.

8. A transmission mechanism as defined in claim 1, wherein said first and second moveable elements respectively include first and second shafts having orthogonal axes, said cams being disposed at axially spaced-apart locations on said first shaft for engaging corresponding arrays of spaced-apart rollers, said rollers of each said arrays of spaced-apart rollers having a frusto-conical shape and a rotating axis which is angled with respect to said second shaft, said rotating axes forming a circular conical surface, and wherein each said cams has a fully convex contoured cam surface generated by a vector $r_c$ which is defined as follows:

$$\alpha_3 < \arctan\left(\frac{\sin\alpha_1}{\cos\alpha_1 + 1/N}\right)$$

$$k_1 = \arctan\left(\frac{\sin\alpha_1}{\cos\alpha_1 - N}\right)$$

$$k_2 = \cos(\alpha_1 - k_1)\cos\phi\sin\alpha_3 + \cos\alpha_3\sin(\alpha_1 - k_1)$$

$$k_3 = \sin\alpha_3\sin\phi$$

$$k_4 = \cos\alpha_3\cos(\alpha_1 - k_1) - \cos\phi\sin\alpha_3\sin(\alpha_1 - k_1)$$

$$k_5 = \arctan\left(\frac{\sqrt{k_2^2 + k_3^2}}{k_4}\right)$$

$$k_6 = \arctan\left(\frac{k_3}{k_2}\right)$$

$$k_7 = \sin k_1 \cos(k_5 - \alpha_4) + \cos k_1 \sin(k_5 - \alpha_4)\cos k_6$$

$$r_c = \lambda \begin{bmatrix} -k_7\sin\psi + \sin(k_5 - \alpha_4)\sin k_6 \cos\psi \\ -k_7\cos\psi - \sin(k_5 - \alpha_4)\sin k_6 \sin\psi \\ \cos k_1 \cos(k_5 - \alpha_4) - \sin k_1 \sin(k_5 - \alpha_4)\cos k_6 \end{bmatrix}$$

wherein:

$\psi$: is an angle of rotation of the first shaft;

$\phi$: is an angle of rotation of the second shaft;

$\alpha_1$: is the angle between the axes of the first and second shafts, said angle being valued between 0° and 180°;

$\alpha_3$: is the angle between the axis of the second shaft and the axis of rotation of the rollers;

$\alpha_4$: is an angle of the roller cone;

$k_i$: are temporary variables, where i=1,2,3 . . .

$\lambda$: is a real number defining one specific point along the contoured cam surface;

N: an integer producing the speed reduction as 1/N, with N being equal to the number of rollers on each side of the second element;

and in which $\alpha_3$ satisfies the following condition:

$$\alpha_3 = \arctan(1/N).$$

9. A transmission mechanism as defined in claim 8, wherein said set of cams includes first and second cams disposed at axially spaced-apart locations on said first shaft for respectively engaging first and second corresponding arrays of spaced-apart rollers, said rollers of said first corresponding array of spaced-apart rollers being uniformly distributed along an outer surface of a single ring member concentrically mounted to said second shaft, while said rollers of said second corresponding array of spaced-apart rollers being uniformly distributed along an inner surface of said ring member, said first and second corresponding arrays of spaced-apart rollers being shifted in phase by an angle which is equal to the quotient of 360 degrees by the number of rollers.

10. A transmission mechanism as defined in claim 9, wherein said ring member geometrically corresponds to a segment of a sphere.

11. A transmission mechanism as defined in claim 9, wherein said ring member extends from a periphery of a disc member secured to said second shaft.

12. A transmission mechanism for transmitting motion between a rotating shaft and a linearly translating member having nonparallel axes, comprising a set of cams disposed at axially spaced-apart locations on said rotating shaft for rotation therewith about said axis of said rotating shaft, and corresponding arrays of spaced-apart rollers connected to said linearly translating member for movement therewith, each said cam being in a common plane with one of said corresponding arrays of spaced-apart rollers placed in axially extending rows on said linearly translating member, said axially extending rows being parallel to a direction of motion of said linearly translating member, and wherein each said cams has a fully convex contoured cam surface generated by a vector $r_c$ which is defined as follows:

$$a_3 < \frac{a_1}{1 + 1/N}$$

$$k_1 = -\frac{2\pi a_3}{N}\sin\alpha_1$$

$$k_2 = \sqrt{\left(\frac{2\pi a_3 \psi \sin\alpha_1}{N}\right)^2 + \left(a_1 + a_3 + \frac{2\pi a_3 \sin\alpha_1}{N}\right)^2}$$

$$k_3 = \arctan\left(\frac{-2\pi a_3 \psi \sin\alpha_1}{(a_1 + a_3)N + 2\pi a_3 \sin\alpha_1}\right)$$

$$r_c = \begin{bmatrix} k_1\cos\psi + (k_2 - a_4)\cos(k_3 - \psi) \\ -k_1\sin\psi + (k_2 - a_4)\sin(k_3 - \psi) \\ \lambda \end{bmatrix}$$

wherein:

$\psi$: is an angle of rotation of the rotating shaft;

$\alpha_1$: is the angle between the rotating shaft and the linearly translating member;

$a_1$: is a distance between the axis of the rotating shaft and a reference line parallel to the direction of motion of said linearly translating member;

$a_3$: is a distance between the reference line and an axis passing through the center of the rollers;

$a_4$: is a radius of the rollers;

$k_i$: are temporary variables, where i=1,2,3 . . .

$\lambda$: is a real number defining one specific point along the contoured cam surface 1/N: where N is an integer denoting the number of rollers on each side of the linearly translating member that enter in contact with corresponding cams upon a 360 degrees rotation of cam shaft;

and in which $a_3$ satisfies the following condition:

$$a_3 < a_1/(2/N+1).$$

13. A transmission mechanism as defined in claim 12, wherein said set of cams includes first and second cams adapted to engage corresponding first and second arrays of spaced-apart rollers laterally disposed on opposed longitudinal sides of said linearly translating member.

14. A transmission mechanism as defined in claim 13, wherein said first and second cams are shifted in phase by an angle of 180°.

* * * * *